United States Patent
Leone et al.

(10) Patent No.: US 10,914,243 B2
(45) Date of Patent: ***Feb. 9, 2021

(54) SYSTEM AND METHOD FOR VARIABLE COMPRESSION RATIO ENGINE

(71) Applicant: Ford Global Technologies, LLC, Dearborn, MI (US)

(72) Inventors: Thomas G. Leone, Ypsilanti, MI (US); Michael Howard Shelby, Plymouth, MI (US); Lyth Alobiedat, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,477

(22) Filed: Jun. 27, 2019

(65) Prior Publication Data

US 2019/0316530 A1 Oct. 17, 2019

Related U.S. Application Data

(63) Continuation of application No. 15/788,036, filed on Oct. 19, 2017, now Pat. No. 10,378,458.

(51) Int. Cl.
*F02D 15/00* (2006.01)
*F02D 35/02* (2006.01)
(Continued)

(52) U.S. Cl.
CPC ............. *F02D 15/00* (2013.01); *F02B 75/04* (2013.01); *F02B 75/044* (2013.01);
(Continued)

(58) Field of Classification Search
CPC ...... F02D 15/00; F02D 15/02; F02D 35/0069; F02D 13/0215; F02D 13/0261;
(Continued)

(56) References Cited

U.S. PATENT DOCUMENTS 4,469,055 A 9/1984 Caswell
4,505,152 A 3/1985 Haddox
(Continued)

FOREIGN PATENT DOCUMENTS

DE 102009013323 A1 9/2010
DE 102012112434 A1 6/2014
WO 2016016229 A2 2/2016

OTHER PUBLICATIONS

Shelby, M. et al., "Fuel Economy Potential of Variable Compression Ratio for Light Duty Vehicles," SAE International Journal of Engines—V126-3EJ, vol. 10, No. 3, Jun. 2017, Available Online Mar. 28, 2017, 15 pages.

*Primary Examiner* — George C Jin
(74) *Attorney, Agent, or Firm* — Geoffrey Brumbaugh; McCoy Russell LLP (57) ABSTRACT

Methods and systems are provided for improving calibration of a variable compression ratio engine. Cylinder-to-cylinder compression ratio variations are detected and accounted for by comparing cylinder fuel flow and IMEP at each compression ratio setting. Dilution parameters including EGR and VCT schedule are also calibrated to account for the cylinder-to-cylinder compression ratio variations.

20 Claims, 6 Drawing Sheets (51) Int. Cl.
*F02B 75/04* (2006.01)
*F02D 13/02* (2006.01)
*F02D 41/00* (2006.01)
*F02D 41/24* (2006.01)

(52) U.S. Cl.
CPC ..... *F02D 13/0215* (2013.01); *F02D 13/0261* (2013.01); *F02D 35/027* (2013.01); *F02D 41/0065* (2013.01); *F02D 41/2451* (2013.01); *F02D 2200/0611* (2013.01); *F02D 2200/101* (2013.01); *F02D 2200/1002* (2013.01); *F02D 2200/602* (2013.01); *F02D 2200/70* (2013.01)

(58) Field of Classification Search
CPC ............. F02D 13/0234; F02D 13/0269; F02D 41/2451; F02D 41/0065; F02D 41/2477; F02D 2200/70; F02D 2200/602; F02D 2200/101; F02D 2200/0611; F02D 2200/1002; F02B 75/044; F02B 75/045; F02B 75/048
See application file for complete search history.

(56) References Cited

U.S. PATENT DOCUMENTS

| | | |
|---|---|---|
| 4,633,707 A | 1/1987 | Haddox |
| 4,836,015 A | 6/1989 | Krage |
| 6,666,177 B1 | 12/2003 | Stiebels et al. |
| 7,165,517 B2 | 1/2007 | Sugiyama et al. |
| 8,468,873 B2 | 6/2013 | Huber et al. |
| 10,415,493 B2 * | 9/2019 | Leone .................. F02B 75/045 |
| 2003/0051685 A1 | 3/2003 | Hiyoshi et al. |
| 2014/0123957 A1 | 5/2014 | Woo et al. |
| 2015/0122225 A1 * | 5/2015 | Kamada .................. F02D 15/04 123/48 R |
| 2015/0267625 A1 | 9/2015 | Kiyomura |
| 2019/0120160 A1 | 4/2019 | Leone et al. |

* cited by examiner

| Nominal CR | Actual CR | | | |
|---|---|---|---|---|
| | Cyl_1 | Cyl_2 | Cyl_3 | Cyl_4 |
| 8 | 8.4 | 8.0 | 8.1 | 7.4 |
| 10 | 10.5 | 10.1 | 10.0 | 9.5 |
| 12 | 12.5 | 12.1 | 12.0 | 11.5 |
| 14 | 14.6 | 14.1 | 13.9 | 13.6 |

SYSTEM AND METHOD FOR VARIABLE COMPRESSION RATIO ENGINE

CROSS REFERENCE TO RELATED APPLICATIONS

The present application is a continuation of U.S. Non-Provisional patent application Ser. No. 15/788,036, entitled "SYSTEM AND METHOD FOR VARIABLE COMPRESSION RATIO ENGINE", and filed on Oct. 19, 2017. The entire contents of the above-listed application are hereby incorporated by reference for all purposes.

FIELD

The present description relates generally to methods and systems for controlling a compression ratio of a variable compression ratio engine.

BACKGROUND/SUMMARY

The compression ratio (CR) of an internal combustion engine is defined as the ratio of the cylinder volume when the piston is at bottom-dead-center (BDC) to the cylinder volume when the piston is at top-dead-center (TDC). Generally, the higher the compression ratio, the higher the thermal efficiency and fuel economy of the internal combustion engine. Variable Compression Ratio (VCR) engines have been developed wherein the compression ratio of each cylinder can be varied between a higher and a lower setting to improve engine performance. For example, the higher compression ratio setting may be used during knock-free conditions to take advantage of the high thermal efficiency while the lower compression ratio setting may be used during knock prone conditions. In the VCR engines, a linkage or other mechanism (e.g., an eccentric) may be coupled to the piston of each cylinder to mechanically vary the compression ratio between the higher and lower settings.

One example of a VCR engine is shown by Caswell at U.S. Pat. No. 4,469,055. Therein, during engine running, the CR of the engine is adjusted based on engine operating conditions. For example, the CR may be optimized for engine fuel efficiency or engine performance, or both. The CR calibration, that is the CR commanded as a function of engine speed and load, may be calibrated based on a prototype engine.

However, the inventors herein have identified potential issues with such systems. As one example, the adjustment of the CR during engine operation requires the actual CR to be known accurately. However, each engine may have a slightly different compression ratio (CR) in each cylinder, due to manufacturing tolerances. In a VCR engine, each component of the VCR mechanism may have manufacturing tolerances leading to significant part-to-part variation, in addition to the normal variation on non-VCR engines. A VCR calibration based on the average CR (that is, the average of the CR across all engine cylinders) may result in extra spark retard usage on those cylinders which have a higher-than-average CR, leading to a much lower efficiency on those cylinders. Use of premium manufacturing methods and/or "select fit" parts can be used to control CR differences between cylinders, but such approaches add significant cost. Since VCR engines raise the compression ratio as much as possible, they tend to be knock-limited over a large portion of the engine operating map, and for a large fraction of a drive cycle. Without knowing the actual CR of each cylinder, and the cylinder-to-cylinder variations, it may be difficult to optimize the CR calibration, resulting in engine performance losses.

In one example, the above issues may be at least partly addressed by a method comprising: actuating a variable compression ratio mechanism of an engine to mechanically adjust a target compression ratio of the engine in accordance with an updated calibration, the updated calibration based on each of fuel flow and peak torque of each cylinder at each compression ratio setting of the mechanism. In this way, CR optimization of a VCR engine is improved.

As one example, the actual CR of each cylinder of a VCR engine may be quantified as a function of each VCR mechanism setting. For example, the CR of each engine cylinder may be quantified first while operating the VCR engine at a lower CR setting. Then, the CR of each engine cylinder may be quantified while operating the VCR engine at a higher CR setting. Then, the fuel flow and maximum IMEP of each cylinder may be quantified as a function of each VCR mechanism setting. Further, the parameters may be quantified as a function of the existing engine operating conditions, such as engine speed, engine torque, fuel octane, inlet air temperature, humidity, etc. The fuel flow and IMEP of all cylinders may then be summed to quantify the total engine fuel flow and total IMEP of the engine as a function of each VCR mechanism setting, at the current operating conditions. Thereafter, at each engine operating condition where driver demand is below a threshold, the engine controller may select the VCR mechanism setting which gives the minimum total engine fuel flow. At each operating condition where driver demand is above the threshold, the controller may select the VCR mechanism setting which gives the maximum total engine IMEP. The threshold may be a pre-determined value, or it may be adjusted as a function of current engine speed, fuel octane, ambient temperature, humidity, etc.

In this way, the efficiency of a VCR engine may be improved by detecting and compensating for cylinder-to-cylinder variations in compression ratio. The technical effect of learning fuel flow and IMEP of all cylinders as a function of each CR setting of the VCR engine is that CR variations of the actual engine may be learned, instead of relying on a prototype engine which may be significantly different from the given engine. Further, the VCR engine can be calibrated without relying on expensive manufacturing methods and/or components. By selecting a CR setting for the VCR engine that corresponds to the lowest total engine fuel flow when operator torque demand is low, fuel consumption and carbon dioxide ($CO_2$) emissions can be minimized. By selecting a CR setting for the VCR engine that corresponds to the highest total torque when operator torque demand is high, engine performance can be maximized. Overall, engine performance and fuel efficiency of a VCR engine can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
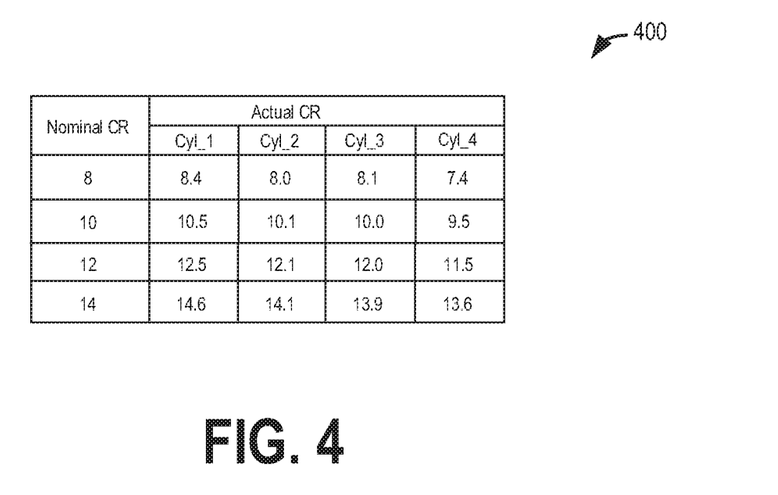
FIG. 4 depicts an example table showing differences between actual and expected CR of a VCR engine.
Figure 5:
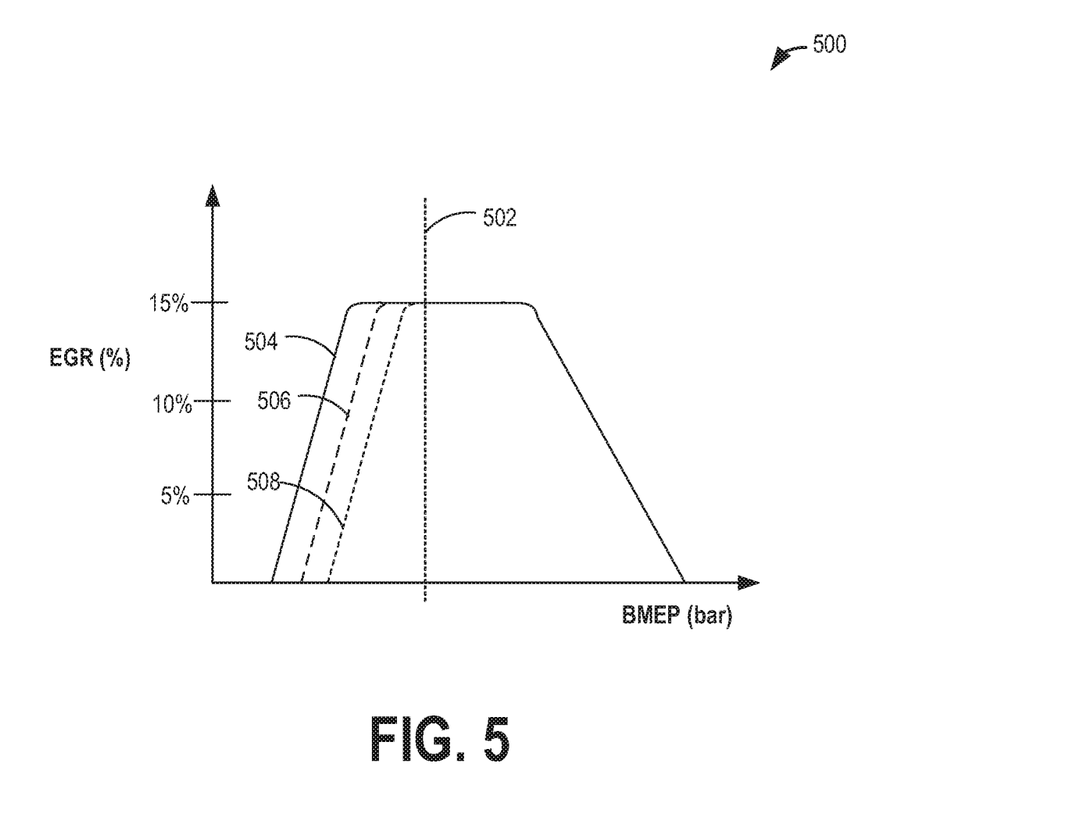
FIG. 5 depicts example differences between a nominal and a modified EGR and VCT schedule of a VCR engine.
Figure 6:
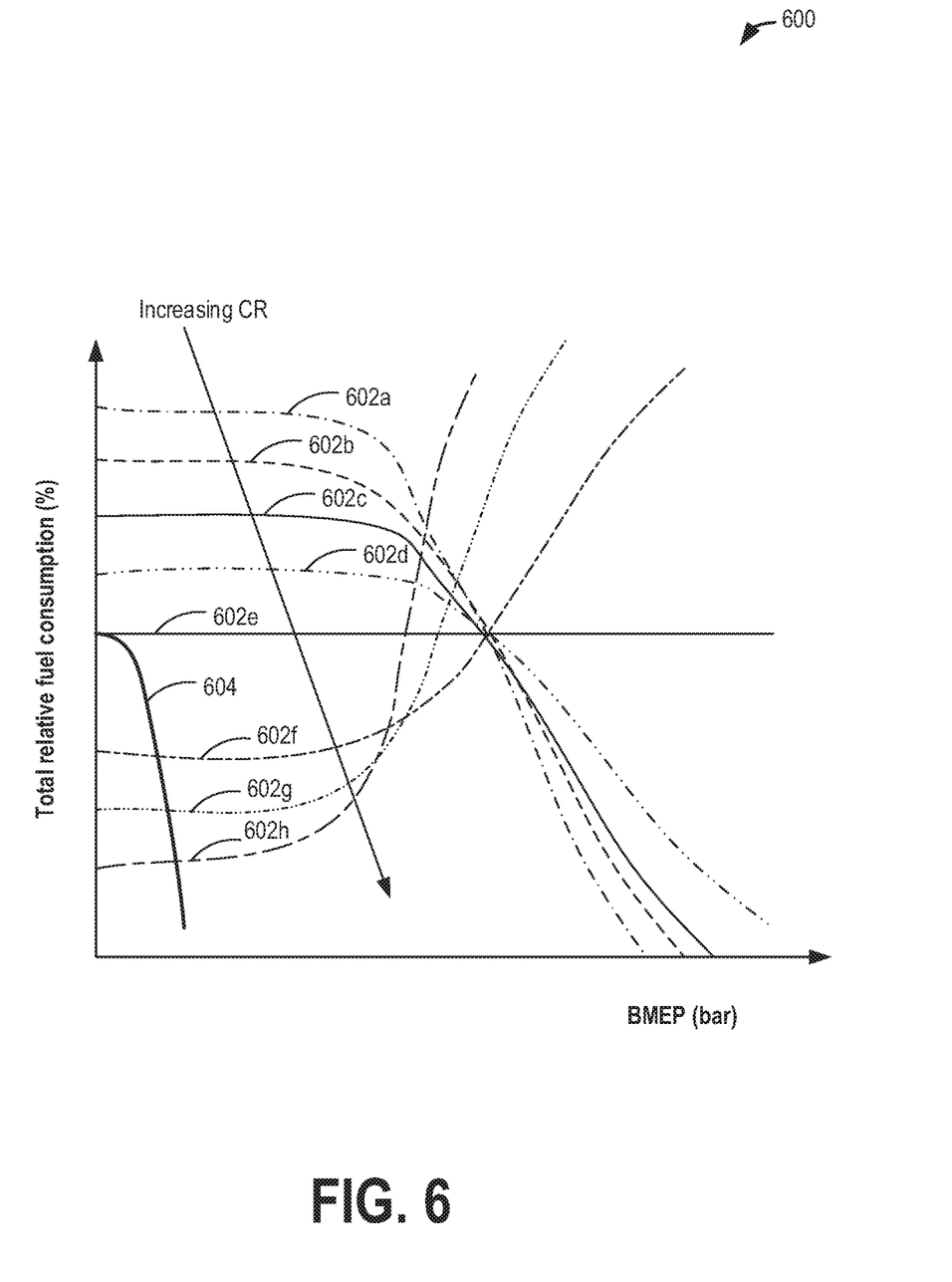
FIG. 6 depicts a prophetic example of VCR engine control.
Figure 7:
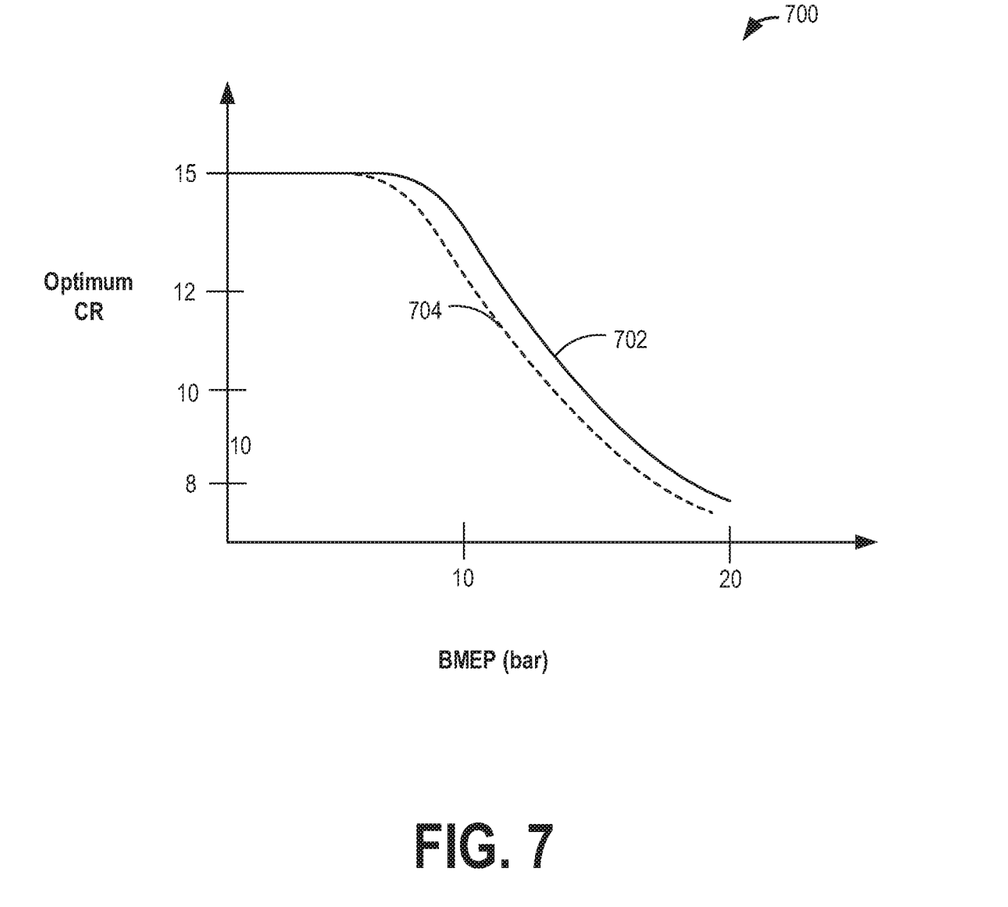
FIG. 7 depicts example differences between a nominal and a modified CR schedule of a VCR engine.

The following description relates to systems and methods for engine system configured with a variable compression ratio (VCR) mechanism, as described with reference to the engine system of FIG. 1. A controller may be configured to perform a control routine, such as the example routine of FIGS. 2-3, to calibrate the CR commanded at a given engine speed-load by learning actual cylinder-to-cylinder variations in CR based on differences in fuel economy and output torque of each cylinder at each CR setting of the VCR engine. During conditions when dilution control is required, the controller may also modify a nominal EGR (Exhaust Gas Recirculation) or VCT (Variable Camshaft Timing) schedule based on the mapped cylinder-to-cylinder CR variations. Example modifications to a CR calibration and an EGR calibration are shown at the tables of FIGS. 4-5 and 7. An example of adjusting engine operation based on the CR and EGR calibration is shown with reference to FIG. 6. In this way, the performance and fuel economy of a VCR engine can be improved.

Figure 1:
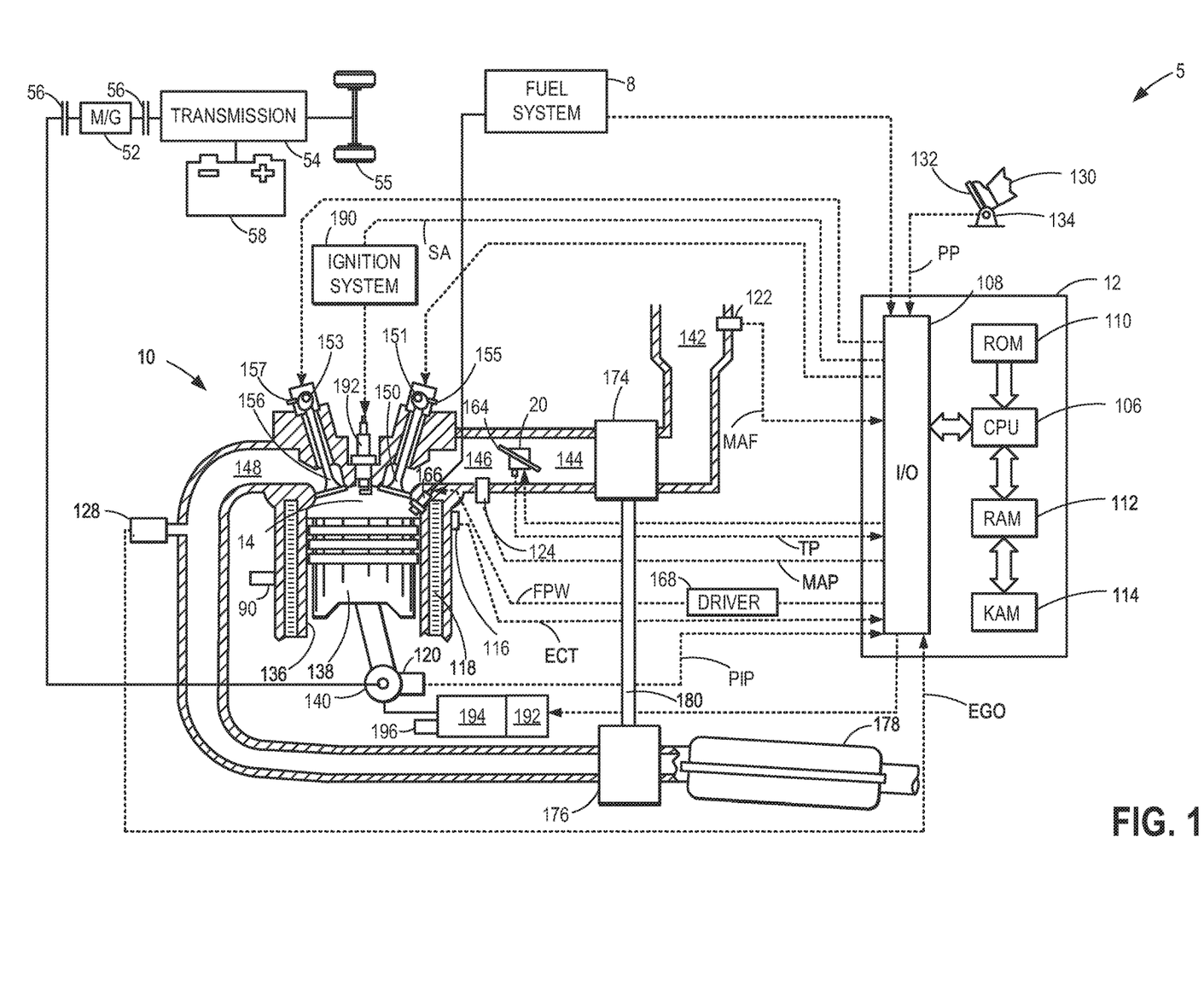
FIG. 1 shows an example variable compression ratio (VCR) engine system.

FIG. 1 depicts an example embodiment of a combustion chamber or cylinder of internal combustion engine 10. Engine 10 may be included in a vehicle system 5, such as a vehicle configured for on-road propulsion. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Engine 10 may be configured as a variable compression ratio (VCR) engine wherein the compression ratio (CR) of each cylinder (that is, the ratio of the cylinder volume when the piston is at bottom-dead-center (BDC) to the cylinder volume when the piston is at top-dead-center (TDC)) can be mechanically altered. The CR of the engine may be varied via a VCR actuator 192 actuating a VCR mechanism 194. In some example embodiments, the CR may be varied between a first, lower CR (wherein the ratio of cylinder volume when the piston is at BDC to the cylinder volume when the piston is at TDC is smaller) and a second, higher CR (wherein the ratio is higher). In still other example embodiments, there may be predefined number of stepped compression ratios. Further still, the CR may be continuously variable between the first, lower CR and the second, higher CR (to any CR in between).

In the depicted example, VCR mechanism 194 is coupled to piston 138 such that the VCR mechanism may change the piston TDC position. For example, piston 138 may be coupled to crankshaft 140 via a piston position changing VCR mechanism 194 that moves the pistons closer to or further from the cylinder head, thus changing the size of combustion chamber 14. A position sensor 196 may be coupled to the VCR mechanism 192 and may be configured to provide feedback to controller 12 regarding the position of VCR mechanism 194 (and thereby the compression ratio) being applied to the cylinder.

In one example, changing the position of the piston within the combustion chamber also changes the relative displacement of the piston within the cylinder. The piston position changing VCR mechanism may be coupled to a conventional cranktrain or an unconventional cranktrain. Non-limiting examples of an unconventional cranktrain to which the VCR mechanism may be coupled include variable distance head crankshafts and variable kinematic length crankshafts. In one example, crankshaft 140 may be configured as an eccentric shaft. In another example, an eccentric may be coupled to, or in the area of a piston pin, the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). In still another example, the VCR mechanism may include a hydraulic pressure, air pressure, or mechanical spring reactive piston. Further still, the VCR mechanism may include a multi-link mechanism or a bent rod mechanism. Still other VCR mechanizations may be possible. It will be appreciated that as used herein, the VCR engine may be configured to adjust the CR of the engine via mechanical adjustments that vary a piston position or a cylinder head position or a cylinder head volume. As such, VCR mechanisms do not include effective CR adjustments achieved via adjustments to a valve timing or cam timing.

By adjusting the position of the piston within the cylinder, an actual (static) compression ratio of the engine (that is a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to actuate the VCR mechanism to a first position where the piston has a smaller effective displacement within the combustion chamber. As another example, the engine may be operated at a second, higher compression ratio by the controller sending a signal to actuate the VCR mechanism to a second position where the piston has a larger effective displacement within the combustion chamber. Changes in the engine compression ratio may be advantageously used to improve fuel economy. For example, a higher compression ratio may be used to improve fuel economy at light to moderate engine loads until spark retard from early knock onset erodes the fuel economy benefit. The engine can then be switched to a lower compression ratio, thereby trading off the efficiency benefits of higher compression ratio for the efficiency benefits of optimized combustion phasing. Continuous VCR systems may continuously optimize the trade-offs between combustion phasing and the efficiency benefits of higher compression ratio, to provide the best compression ratio between the higher compression ratio and lower compression ratio limits at the given operating conditions. In one example, an engine controller may refer a look-up table to select a compression ratio to apply based on engine speed-load conditions. As elaborated below, the selecting may include selecting a lower compression ratio at higher engine loads, and selecting a higher compression ratio at lower engine loads.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor of the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be mechanically varied based on driver demand via adjustments to a VCR actuator 192 that actuates a VCR mechanism 194, varying the effective position of piston 138 within combustion chamber 14. The compression ratio may be inferred based on feedback from sensor 196 regarding the position of the VCR mechanism 194.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. For example, knock may be identified responsive to knock sensor output estimated in a knock window being higher than a knock threshold, while pre-ignition may be identified responsive to knock sensor output estimated in a pre-ignition window being higher than a pre-ignition threshold, the pre-ignition threshold higher than the knock threshold, the pre-ignition window earlier than the knock window. Further, the abnormal combustion may be accordingly addressed. For example, knock may be addressed by reducing the compression ratio and/or retarding spark timing while pre-ignition may be addressed by enriching the engine and/or limiting an engine load. In addition, lowering the compression ratio also reduces the changes of further pre-ignition.

Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, abnormal combustion from knock sensor 90 and a crankshaft acceleration sensor, and VCR mechanism position from position sensor 196. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. For example, based on the engine speed and load, the controller may adjust the compression ratio of the engine by sending a signal to the VCR actuator which actuates the VCR mechanism to mechanically move the piston closer to or further from the cylinder head, to thereby change a volume of the combustion chamber.

Non-transitory storage medium read-only memory 110 can be programmed with computer readable data representing instructions executable by processor 106 for performing the methods described below as well as other variants that are anticipated but not specifically listed.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

The actual CR of each cylinder affects the knock limit of that cylinder, particularly at high loads, as well as the dilution limits for that cylinder, particularly at light loads.

Due to manufacturing tolerances in the VCR mechanism coupled to each cylinder 30 of engine 10, there may be significant part-to-part variation between the actual CR of each cylinder and the expected CR for that cylinder. In addition, for a given expected CR, there may be significant cylinder-to-cylinder variation in actual CR. As a result of these differences, CR calibration may be non-optimal. Since the CR of an engine also affects the engine's dilution tolerance, errors in CR estimation can also result in non-optimal EGR or VCT (or VVL etc.) calibration. As one example, a lower CR setting may be commanded responsive to high load conditions. However, due to the actual CR of a cylinder being higher than expected, the resulting non-optimal CR may be higher than desired, resulting in the cylinder becoming excessively knock limited. As another example, a higher CR setting may be commanded responsive to low load conditions. However, due to the actual CR of a cylinder being lower than expected, the resulting non-optimal CR may be lower than desired, resulting in the cylinder becoming combustion stability and NVH limited.

Figure 2:
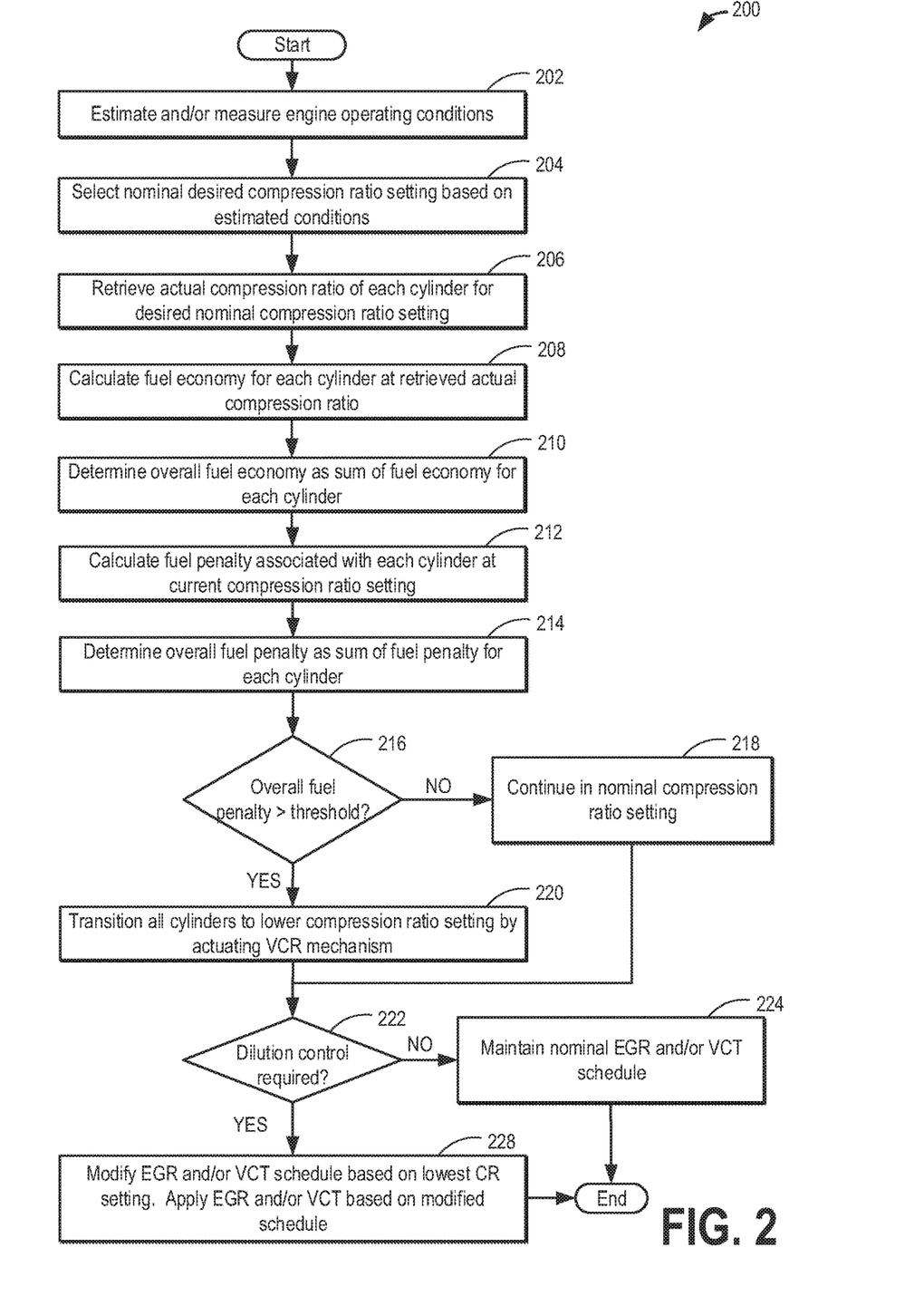
FIG. 2 depicts an example high-level flow chart for optimizing the CR calibration and dilution calibration of a VCR engine.
Figure 3:
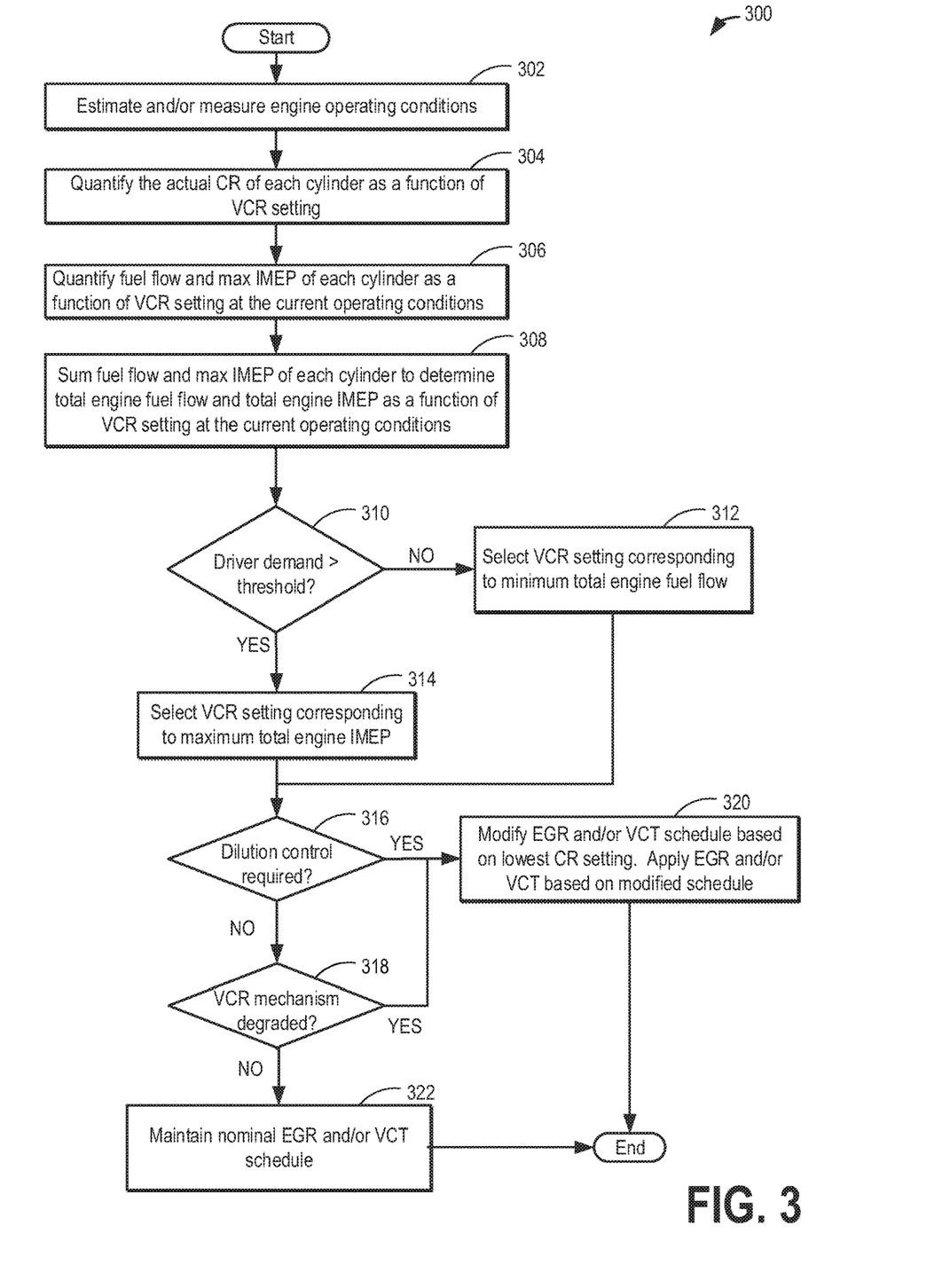
FIG. 3 depicts another example high-level flow chart for optimizing the CR calibration and dilution calibration of a VCR engine.

As elaborated with reference to FIGS. 2-3, an engine controller may update a CR calibration (that is, a calibration of the CR to command at a given engine speed and load) based on calculated differences in fuel usage and torque output of each cylinder at each CR setting of the VCR engine. The engine controller may also update an EGR and/or VCT calibration (that is, a calibration of the dilution to command at a given engine speed and load) based on the calculated differences in fuel usage and torque output of each cylinder at each CR setting of the VCR engine. As a result, VCR engine performance may be improved.

Now turning to FIG. 2, an example routine 200 is described for calibrating a VCR engine. The method reduces performance losses arising from cylinder-to-cylinder variations in CR, due to manufacturing tolerances. Instructions for carrying out method 200 as well the other methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes estimating and/or measuring engine operating conditions. Engine operating conditions may include, for example, driver power demand (for example, as based on an output of a pedal position sensor coupled to an operator pedal); ambient temperature, pressure, and humidity; engine speed, engine temperature; manifold pressure (MAP); manifold air flow (MAF); catalyst temperature; intake temperature; boost level; fuel octane of fuel available in a fuel tank; etc.

It will be appreciated that in an alternate example, method 200 may be triggered during a first engine start following manufacture of the engine to allow for the engine to be calibrated. In still other examples, method 200 may be triggered responsive to engine repair or servicing (as indicated by a disconnected battery, or input from a diagnostic tool, or input from a GUI).

At 204, method 200 includes selecting a desired compression ratio for operating the engine based on the estimated engine operating conditions. The engine may be configured with a VCR mechanism (e.g., VCR mechanism 194 of FIG. 1) that mechanically alters the engine compression ratio between a first, lower and a second, higher compression ratio setting. The VCR mechanism may achieve this by mechanically altering a piston position within a cylinder. Alternatively, multiple compression ratios between the first and second compression ratio may be possible. The controller may calculate the fuel efficiency at each possible compression ratio of the engine at the given driver power demand and select the compression ratio that provides the highest fuel efficiency. The controller may compare the fuel efficiency at each compression ratio by comparing the brake specific fuel consumption (BSFC) of the engine at each compression ratio, for example, from a look-up table stored in the controller's memory, the look-up table populated during an initial engine calibration based on a prototype engine with substantially the same CR on each cylinder. The fuel efficiency of the engine at each compression ratio may be determined via a table, a map, an algorithm, and/or an equation, each stored as a function of operating conditions (e.g., engine speed, torque, temperature, humidity, inferred fuel octane, etc.), the settings populated during an initial engine calibration based on a prototype engine. In general, as engine load or BMEP increases, the compression ratio selected may be decreased due to trade-offs between the efficiency benefits of higher CR (which dominate at lower loads) versus the efficiency penalties of knock-limited combustion phasing (which dominate at higher loads). Thus a lower compression ratio is selected at higher engine loads and a higher compression ratio is selected at lower engine loads.

At 206, the method includes retrieving the actual compression ratio setting of each cylinder at the desired nominal compression ratio setting. For example, a look-up table such as the table of FIG. 4 may be referred to so as to determine if the actual CR for the given cylinder is over or under the desired nominal CR setting.

At 208, the method includes calculating a fuel economy (or fuel usage) associated with each cylinder at the retrieved actual compression ratio. For example, if the actual CR of the selected cylinder is higher than the desired nominal CR setting, it may be determined that the fuel economy for that cylinder is degraded at high loads due to additional spark retard (later knock-limited combustion phasing). At 210, the method includes determining an overall fuel economy of the engine by summing the fuel economy for each cylinder.

At 212, the method includes calculating a fuel penalty associated with each cylinder at the retrieved actual compression ratio. For example, if the actual CR of the selected cylinder is higher than the desired nominal CR setting, and the engine is currently operating at high load where it is knock-limited, it may be determined that there is a fuel penalty for that cylinder which is a function of the difference between the actual CR of the selected cylinder and the desired nominal CR setting. At 214, the method includes determining an overall fuel penalty of the engine by summing the fuel penalty for each cylinder.

As one example, the actual CR data may be retrieved from a look-up table stored in the controller's memory, such as table 400 of FIG. 4. The look-up table may be populated with the data immediately after engine manufacture, replacement, or major service. For example, CR of each cylinder may be quantified by measuring dimensions of key engine parts during manufacturing. Alternatively, the CR of each cylinder may be quantified during end-of-line spin testing by measuring cylinder pressure in each cylinder, or by using radio frequency tranceivers in each cylinder, or by measuring a crank-angle-resolved crankshaft acceleration profile. The known CR of each cylinder may be stored in the controller's memory immediately after engine manufacture, and updated if necessary by a service technician after engine replacement or major service. In doing so, for each cylinder, it may be determined if the actual CR for the given cylinder is over or under the given CR setting. For example, with reference to table 400 of FIG. 4, the actual CR of cylinder 1 is significantly higher than the expected setting while the actual CR of cylinder 4 is significantly lower than the expected setting, and the difference between expected and actual CR varies with nominal CR. When operating the engine at higher loads, the higher than expected actual CR of cylinder 1 may cause cylinder 1 to be more knock-limited than the other cylinders, thus requiring additional spark retard. This results in a fuel efficiency penalty for cylinder 1 at high loads.

At 216, the overall fuel penalty due to actual versus nominal CR may be compared to a threshold. If the penalty is lower than a threshold, that is if there is no significant fuel penalty associated with actual versus nominal CR, then at 218, the method includes continuing engine operation at the desired nominal CR setting selected at 204. For example, an engine with little cylinder-to-cylinder variation in actual CR would operate most efficiently with the desired nominal CR selected at 204 because this desired nominal CR was determined from testing of a prototype engine with little cylinder-to-cylinder variation in actual CR (see for example, plot 702 of map 700 of FIG. 7).

Else, if there is a significant fuel economy penalty associated with actual versus nominal CR, then at 220, the method includes actuating the VCR mechanism to a lower CR setting. For example, the controller may send a signal to the VCR actuator to move the VCR mechanism to reduce CR by 0.2 ratios before repeating the sequence of method 200. For an engine where one or more cylinders has a higher than nominal CR, which is operating at a high load where the engine is knock-limited, the optimum CR will be lower (as shown at plot 704 of map 700 of FIG. 7) than the desired nominal CR which was determined from testing of a prototype engine with little cylinder-to-cylinder variation in actual CR.

From each of 218 and 220, the method moves to 222 to determine if engine dilution control is required. In one example, engine dilution control is required when engine load is less than a threshold load where combustion stability is a constraint on EGR and/or VCT (or VVL etc.) schedule. In another example, engine dilution control is required below a threshold load which varies with engine speed, temperature, or other factors. If dilution control is not required, then at 224, a nominal VCT and/or EGR schedule may be maintained. Else, if dilution control is required, then at 228, the nominal VCT and/or EGR schedule may be updated. In particular, the controller may modify the nominal EGR/VCT schedule based on the lowest CR of all the cylinders, as determined at 206. The lower CR leads to degraded combustion stability at light loads, which reduces dilution tolerance and therefore lowers the optimum EGR rate. It also moves the optimum VCT/VVL schedule towards lower "internal EGR" (lower overlap and/or earlier exhaust valve closing time) and/or towards higher effective CR (earlier intake valve closing time). Mapping data from a prototype engine with little cylinder-to-cylinder variation in actual CR may be used to quantify the optimum (combustion stability limited) EGR and/or VCT schedules as a function of CR. The combustion stability limit is determined by the "worst case" cylinder, in this case the cylinder with the lowest CR. Therefore the combustion stability limited EGR and/or VCT settings at light loads are simply determined by using the the CR of the lowest CR cylinder, instead of using the nominal CR. For example, for an engine where one or more cylinders has a lower than nominal CR, which is operating below a load threshold where combustion stability is a constraint, a lower EGR amount and/or a lower valve overlap and/or and earlier EVC setting may be applied (as shown at plots 506 and 508 of FIG. 5).

As elaborated at FIG. 3, the EGR and/or VCT schedules may be modified any time the VCR mechanism is degraded, such as may occur due to component degradation or due to entry conditions not being met. In particular, it may be determined if the actual VCR mechanism position is different from a desired VCR. The unmet VCR actuator entry conditions may include conditions pertaining to temperature, oil pressure, electrical current limit, etc. If VCR degradation is detected then a lower EGR amount and/or a lower valve overlap and/or and earlier EVC setting may be applied, as illustrated in FIG. 5.

Turning now to FIG. 3, another example method 300 for calibrating a VCR engine is shown. At 302, as at 202, method 300 includes estimating and/or measuring engine operating conditions. Engine operating conditions may include, for example, driver power demand (for example, as based on an output of a pedal position sensor coupled to an operator pedal); ambient temperature, pressure, and humidity; engine speed, engine temperature; manifold pressure (MAP); manifold air flow (MAF); catalyst temperature; intake temperature; boost level; fuel octane of fuel available in a fuel tank; etc.

It will be appreciated that in some cases, method 300 may be triggered during a first engine start following manufacture of the engine to allow for the engine to be calibrated. In other cases, method 300 may be triggered responsive to engine repair or servicing (as indicated for example by a disconnected battery, or input from a diagnostic tool, or input from a GUI).

At 304, method 300 includes quantifying the actual CR of each cylinder of the engine at each CR setting of the engine. As one example, the actual CR data may be retrieved from a look-up table stored in the controller's memory, such as table 400 of FIG. 4. The look-up table may be populated with the data immediately after engine manufacture, replacement, or major service. For example, CR of each cylinder may be quantified during end-of-line spin testing, based on measured cylinder pressure, or using radio frequency tranceivers in each cylinder, or based on measured crank-angle-resolved crankshaft acceleration profile, or based on measured dimensions of key engine parts. The known CR of each cylinder could be stored in the controller's memory immediately after engine manufacture, and updated if necessary by a service technician after engine replacement or major service. In doing so, for each cylinder, it may be determined if the actual CR for the given cylinder is over or under the given CR setting. For example, with reference to table 400 of FIG. 4, the actual CR of cylinder 1 is significantly higher than the expected setting while the actual CR of cylinder 4 is significantly lower than the expected setting, and the difference between expected and actual CR varies with nominal CR. When operating the engine at higher loads, the higher than expected actual CR of cylinder 1 may cause cylinder 1 to be more knock-limited than the other cylinders, thus requiring additional spark retard. This results in a fuel efficiency penalty.

At 306, method 300 includes quantifying fuel flow and maximum in-cylinder mean effective pressure (IMEP) of each cylinder as a function of the VCR mechanism setting (nominal CR) at the current operating conditions. For each possible setting of nominal CR, the controller calculates the fuel flow and IMEP for each individual cylinder at its actual compression ratio. The controller may calculate the fuel flow and IMEP at each compression ratio by using a look-up table stored in the controller's memory, the look-up table populated during an initial engine calibration based on a prototype engine with substantially the same CR on each cylinder. The fuel flow per cylinder on the prototype engine is simply the total fuel flow divided by the number of cylinders. The IMEP is based on cylinder pressure data on the prototype engine. At 306 the IMEP and the fuel flow for each cylinder is calculated for each nominal CR (VCR mechanism setting), but using the actual CR of each cylinder. If an engine has little cylinder-to-cylinder variation in CR, then the calculated IMEP and fuel flow in each cylinder is almost the same, and the minimum total engine IMEP and fuel flow are achieved at the same CR as the minimum fuel flow and IMEP for the prototype engine. However, for an engine with high cylinder-to-cylinder variation in CR (such as the engine illustrated in FIG. 4), when operated at high loads where the engine is knock-limited, the calculated fuel flow and IMEP will be different in each cylinder. For cylinder 1 of the engine illustrated in FIG. 4, the CR used in the fuel flow calculation will be higher and IMEP will be lower at higher CR, due to knock-limited combustion phasing. The effects of knock-limited combustion phasing are non-linear so optimum nominal CR cannot be determined by simply averaging the CR of all cylinders; the cylinder with the highest CR has a disproportionate effect under knock-limited conditions. At high loads, the optimum nominal CR for this engine will be lower than the prototype engine, as illustrated by the dashed line in FIG. 7.

It will be appreciated that while the method suggests quantifying fuel flow and IMEP of each cylinder, this is not meant to be limiting, and that in alternate examples, other cylinder parameters indicative of fuel economy and performance may be used. For example, in alternate examples, the metric quantified by the controller (at part load conditions, such as when below a threshold load) may include efficiency or Brake Specific Fuel Consumption (BSFC), while the metric quantified at higher load conditions (such as near peak load or when above the threshold load) may include torque, power, or Brake Specific Air Consumption (BSAC).

At 310, it may be determined if the driver demand is higher than a threshold. The threshold may be based on an accelerator pedal position. As such, above the threshold, it may be inferred that the driver prioritizes performance over efficiency, while below the threshold, maximum performance is not required and VCR control can be optimized for efficiency.

If the driver demand is below the threshold, then at 312, the method includes selecting the VCR setting corresponding to the minimum total engine fuel flow. By selecting the VCR setting corresponding to the minimum total engine fuel flow during part load conditions, fuel consumption and $CO_2$ emissions can be minimized. Else, at 314, if the driver demand is above the threshold load, the method includes selecting the VCR setting corresponding to the maximum total IMEP. By selecting the VCR setting corresponding to the maximum total IMEP during peak load conditions, vehicle acceleration performance can be maximized.

From each of 312 and 314, the method moves to 316 to determine if engine dilution control is required. In one example, engine dilution control is required when engine load is less than the threshold load. If dilution control is required, then at 320, the nominal VCT and/or EGR schedule may be updated. In particular, the controller may modify the nominal EGR/VCT schedule based on the lowest CR of all the cylinders. The lower CR leads to degraded combustion stability at light loads, which reduces dilution tolerance and therefore lowers the optimum EGR rate. It also moves the optimum VCT schedule towards lower "internal EGR" (lower overlap and/or earlier exhaust valve closing time) and/or towards higher effective CR (earlier intake valve closing time). Mapping data from a prototype engine with little cylinder-to-cylinder variation in actual CR may be used to quantify the optimum (combustion stability limited) EGR and/or VCT schedules as a function of CR. The combustion stability limit is determined by the "worst case" cylinder, in this case the cylinder with the lowest CR. Therefore the combustion stability limited EGR and/or VCT settings at light loads are calculated based on the lowest CR cylinder, instead of using the nominal CR. For example, for an engine where one or more cylinders has a lower than nominal CR, which is operating below a load threshold where combustion stability is a constraint, a lower EGR amount and/or a lower valve overlap and/or and earlier EVC setting may be applied, as illustrated in FIG. 5 which is further described below.

If engine dilution control is not required, then at 318, it may be determined if there is any degradation or malfunction of the VCR mechanism. In particular, it may be determined if the actual VCR mechanism position is different from a desired VCR. VCR degradation may be determined responsive to VCR component degradation or due to VCR actuator entry conditions not being met. The unmet VCR actuator entry conditions may include conditions pertaining to temperature, oil pressure, electrical current limit, etc. If VCR degradation is detected then a lower EGR amount and/or a lower valve overlap and/or and earlier EVC setting may be applied, as illustrated in FIG. 5.

If VCR degradation is not confirmed, then at 322, a nominal VCT and/or EGR schedule may be maintained. The nominal EGR and/or VCT schedule may be based on engine operating conditions. Else, if VCR degradation is determined, the method returns to 320 to operate with the modified EGR and/or VCT schedule.

FIG. 5 illustrates the effective EGR schedule for a load (BMEP) sweep at various CR, based on data from the prototype engine with substantially the same CR on each cylinder. Plot 504 shows the EGR schedule with 12:1 CR, plot 506 shows the EGR schedule with 10:1 CR, and plot 508 shows the EGR schedule with 8:1 CR. It is understood that the EGR schedule may also be a function of engine speed, engine temperature, air temperature and humidity, etc. The EGR schedule has maximum EGR rates at intermediate BMEP. At higher BMEP the EGR rate may decrease due to EGR's negative effects on volumetric efficiency. At lower BMEP the EGR rate may decrease due to EGR's negative effects on combustion stability. But combustion stability is also degraded with lower CR. For example, a load threshold 502 is shown below which combustion stability is degraded. Therefore lower EGR rates are used when the CR of one or more cylinders is lower. Mapping data from the prototype engine with substantially the same CR on each cylinder is used to create the table, but the cylinder with the lowest actual CR is used with the table to determine the current desired EGR rate. Similar methods would be used to limit "internal EGR" by changing the schedule used for VCT, VVL, etc. as a function of the cylinder with the lowest CR. FIG. 6 illustrates trends in fuel consumption versus load (BMEP) for various CRs. These trends are well-known to experts in the field, because they result from fundamental trade-offs between the efficiency benefits of higher CR versus the efficiency penalties of knock-limited combustion phasing. The results of these trade-offs determine what CR is optimum for each BMEP (the optimum CR also varies with engine speed, fuel octane, inlet air temperature, humidity, etc.). The efficiency benefits of higher CR dominate at lower BMEP, while the efficiency penalties of knock-limited combustion phasing dominate at higher BMEP, as shown by load limited plot 604. Thus, at low BMEP where the engine is not knock-limited the optimum CR is high and FIG. 6 shows that the lowest fuel consumption occurs with the highest CR of 13:1. Plots 602a-h shows fuel consumption decreasing with increasing CR. At high BMEP where the engine is the most knock-limited, the optimum CR is low and FIG. 6 shows that the lowest fuel consumption occurs with the lowest CR of 8:1. At intermediate BMEP, the two factors trade-off to varying degrees and the lowest fuel flow occurs at various CR between low and high. The trends shown in FIG. 6 are quantified from testing of a prototype engine and are used to determine an optimum or desired nominal CR as a function of BMEP, engine speed, fuel octane, inlet air temperature, humidity, etc. which is used for example in step 204 of FIG. 2 and step 306 of FIG. 3.

Using the methods described above, cylinder-to-cylinder variations in compression ratio may be better detected and accounted for. By learning fuel flow and IMEP of all cylinders as a function of each nominal desired CR setting of a VCR engine, actual CR variations of the engine may be learned, and distinguished from CR data acquired on a prototype engine. Further, the VCR engine can be reliably calibrated in a more cost effective manner, while relying on existing sensors and actuators. By adjusting the CR setting to provide the highest fuel economy at low load conditions and highest engine output at high load conditions, engine performance can be improved despite the cylinder-to-cylinder variations in CR. By also adjusting an EGR and VCT schedule of the VCR engine based on the mapped CR of all the engine cylinders, dilution control is improved, enabling the engine to operate closer to the combustion stability limit, with fewer NVH issues. Overall, engine performance and fuel efficiency is increased by improving the calibration of the VCR engine.

One example method for an engine comprises actuating a variable compression ratio mechanism of an engine to mechanically adjust a target compression ratio of the engine in accordance with an updated calibration, the updated calibration based on each of fuel flow and peak torque of each cylinder at each compression ratio setting of the mechanism. In the preceding example, additionally or optionally, the updated calibration includes: estimating the fuel flow and the peak torque of each cylinder at a plurality of compression ratio settings; quantifying a total engine fuel flow of the engine at each of the plurality of compression ratio settings as a sum of the fuel flow of each cylinder at a corresponding compression ratio setting; and learning a total torque of the engine at each of the plurality of compression ratio settings as a sum of the torque of each cylinder at the corresponding compression ratio setting. In any or all of the preceding examples, additionally or optionally, the actuating includes: when driver torque demand is lower than a threshold, actuating the mechanism to one of a plurality of compression ratio settings having a lowest total engine fuel flow; and when driver torque demand is higher than the threshold, actuating the mechanism to another of the plurality of compression ratio settings having a highest total engine torque. In any or all of the preceding examples, additionally or optionally, the threshold is based on one or more of accelerator pedal position, engine speed, fuel octane, ambient temperature, and ambient humidity. In any or all of the preceding examples, additionally or optionally, the method further comprises adjusting an engine dilution calibration based on a lowest of a plurality of compression ratios of individual cylinders. In any or all of the preceding examples, additionally or optionally, the adjusting the engine dilution includes, when the engine load is lower than a threshold, using less dilution as the lowest of the plurality of compression ratios decreases. In any or all of the preceding examples, additionally or optionally, the method further comprises selecting the target compression ratio of the engine based in accordance with a nominal calibration. In any or all of the preceding examples, additionally or optionally, the engine is coupled in a vehicle, the method further comprising updating the nominal calibration of the engine responsive to engine operation following vehicle manufacture, the nominal calibration based on engine testing prior to the vehicle manufacture, the vehicle including a hybrid electric vehicle.

Another example method comprises: comparing a target compression ratio for an engine with an actual compression ratio of each cylinder of the engine; computing a fuel penalty associated with the target compression ratio based on an aggregated difference between the actual compression ratio of each cylinder of the engine and the target compression ratio; and transitioning to a lower compression ratio if the fuel penalty exceeds a threshold. In the preceding example, additionally or optionally, each of the target compression ratio and the actual compression ratio are for a defined compression ratio setting of a variable compression ratio mechanism, the defined compression ratio setting being one of a plurality of compression ratio settings of the engine. In any or all of the preceding examples, additionally or optionally, the transitioning includes actuating a variable compression ratio mechanism to mechanically alter the actual compression ratio of each cylinder of the engine. In any or all of the preceding examples, additionally or optionally, the method further comprises adjusting engine dilution responsive to the transitioning, the adjusting including, when engine load is lower than a threshold, comparing the actual compression ratio of each cylinder of the engine, and applying an engine dilution setting corresponding to a lowest of the actual compression ratio of each cylinder. In any or all of the preceding examples, additionally or optionally, adjusting engine dilution includes adjusting one of an exhaust gas recirculation (EGR) amount and a variable cam timing schedule. In any or all of the preceding examples, additionally or optionally, one of a lower EGR amount, a lower valve overlap, and an earlier exhaust valve closing timing is applied as the lowest of the actual compression ratio of each cylinder decreases.

An example engine system comprises: an engine including a plurality of cylinders; a VCR mechanism coupled to a piston of each cylinder of the plurality of cylinder for applying one of a plurality of compression ratio settings in a given cylinder via mechanical alteration of a piston position within the given cylinder; an EGR passage including an EGR valve for recirculating exhaust gas from an engine exhaust to an engine intake; and a controller with computer readable instructions stored on non-transitory memory for: updating a compression ratio calibration of the engine based on each of fuel flow and peak torque of each cylinder at each of the plurality of compression ratio settings; and actuating the variable compression ratio mechanism of an engine to mechanically adjust a target compression ratio of the engine in accordance with an updated calibration, the updated calibration based on each of fuel flow and peak torque of each cylinder at each compression ratio setting of the mechanism. In the preceding example, additionally or optionally, the updating includes estimating the fuel flow and the peak torque of each of the plurality of cylinders at each of the plurality of compression ratio settings; for each cylinder, quantifying a total engine fuel flow as a sum of the fuel flow at each of the plurality of compression ratio settings; and learning a total torque of the engine at each of the plurality of compression ratio settings as a sum of the torque of each of the plurality of cylinders at a corresponding one of the plurality of compression ratio settings. In any or all of the preceding examples, additionally or optionally, the controller includes further instructions for: when driver torque demand is lower than a threshold, actuating the mechanism to one of the plurality of compression ratio settings having a lowest total engine fuel flow; and when driver torque demand is higher than the threshold, actuating the mechanism to another of the plurality of compression ratio settings having a highest total engine torque. In any or all of the preceding examples, additionally or optionally, the updating is from a nominal compression ratio calibration based on engine testing prior to vehicle manufacture. In any or all of the preceding examples, additionally or optionally, the vehicle is a hybrid electric vehicle and wherein the updating is responsive to engine operation following the vehicle manufacture. In any or all of the preceding examples, additionally or optionally, the controller includes further instructions for: updating an EGR calibration of the engine based on a lowest compression ratio setting of one of the plurality of engine cylinders in the updated compression ratio calibration; and actuating the EGR valve based on engine load and further based on the updated EGR calibration.

Another example method for an engine, comprises calibrating a compression ratio schedule of a variable compression ratio engine based on each of fuel flow and peak torque of each cylinder at each compression ratio setting of the engine; and adjusting exhaust gas recirculation (EGR) flow to the engine in accordance with an updated EGR calibration schedule based on the compression ratio schedule calibration. In the preceding example, additionally or optionally, the calibrating includes, for each cylinder, learning a difference between actual compression ratio and commanded compression ratio at each of a plurality of compression ratio settings. In any or all of the preceding examples, additionally or optionally, the adjusting includes: identifying an engine cylinder having a highest difference between actual compression ratio and commanded compression ratio, wherein the actual compression ratio is lower than the commanded compression ratio; and adjusting an EGR flow to the engine based on the actual compression ratio of the identified engine cylinder. In any or all of the preceding examples, additionally or optionally, the adjusting includes: identifying an engine cylinder having a lowest actual compression ratio; and adjusting an EGR flow to the engine based on the actual compression ratio of the identified engine cylinder. In any or all of the preceding examples, additionally or optionally, the adjusting in accordance with an updated EGR calibration schedule includes adjusting based on a lowest of a plurality of compression ratio settings of an individual cylinder of the engine. In any or all of the preceding examples, additionally or optionally, the adjusting further includes, when engine load is lower than a threshold load, reducing an EGR flow as the lowest of a plurality of compression ratio settings decreases, reducing the EGR flow including one or more of reducing an opening of an EGR valve, adjusting a cylinder valve timing to advance exhaust valve closing, and adjusting the cylinder valve timing to reduce positive intake to exhaust valve overlap. In any or all of the preceding examples, additionally or optionally, the engine is coupled in a vehicle, and wherein the updated EGR calibration schedule is updated from a nominal EGR calibration schedule based on engine testing prior to vehicle manufacture, the vehicle including a hybrid electric vehicle. In any or all of the preceding examples, additionally or optionally, the adjusting further includes, when engine load is higher than the threshold load, adjusting the EGR flow to the engine in accordance with the default EGR calibration schedule. In any or all of the preceding examples, additionally or optionally, the compression ratio schedule calibration includes: estimating each of a fuel flow and a peak torque of each cylinder at each of a plurality of compression ratio settings of the engine; learning a first parameter indicative of fuel flow of the engine at each of the plurality of compression ratio settings; learning a second, different parameter indicative of torque of the engine at each of the plurality of compression ratio settings; and actuating a variable compression ratio mechanism of each engine cylinder based on a selection of one of the first and second parameter, the selection based on driver torque demand. In any or all of the preceding examples, additionally or optionally, the selection includes selecting the first parameter and not the second parameter when the driver torque demand is below a threshold, and selecting the second parameter and not the first parameter when the driver torque demand is above the threshold, the first parameter including one of total engine fuel flow and total brake specific fuel consumption, and the second parameter including one of total engine torque and total in-cylinder mean effective pressure. In any or all of the preceding examples, additionally or optionally, the actuating based on the selection includes actuating the variable compression ratio mechanism based on an engine cylinder having a lowest value of the first parameter when the driver torque demand is below a threshold, and actuating the variable compression ratio mechanism based on the engine cylinder having a highest value of the second parameter when the driver torque demand is above the threshold.

Still another example method comprises: comparing a commanded compression ratio with an actual compression ratio for each cylinder of a variable compression ratio engine having a plurality of compression ratio settings; and adjusting exhaust gas recirculation (EGR) flow to the engine based on the actual compression ratio of an engine cylinder having a lowest actual compression ratio. In the preceding example, additionally or optionally, the EGR flow to the engine is reduced from a nominal EGR flow as a value of the lowest actual compression ratio decreases. In any or all of the preceding examples, additionally or optionally, the adjusting the EGR flow is responsive to engine load lower than a threshold load, the method further comprising, maintaining the nominal EGR flow responsive to engine load higher than the threshold load. In any or all of the preceding examples, additionally or optionally, reducing the EGR flow includes one or more of reducing an opening of an EGR valve, changing valve timing to decrease positive valve overlap, and advancing exhaust valve timing to an earlier exhaust valve closing timing. In any or all of the preceding examples, additionally or optionally, the method further comprises, when engine load is higher than a threshold load, responsive to a difference between the commanded compression ratio and the actual compression ratio of an engine cylinder being higher than a threshold difference, transitioning to a lower compression ratio via mechanical actuation of a variable compression ratio mechanism.

Another example engine system comprises: an engine including a plurality of cylinders; a VCR mechanism coupled to a piston of each cylinder of the plurality of cylinders for applying one of a plurality of compression ratio settings in a given cylinder via mechanical alteration of a piston position within the given cylinder; an EGR passage including an EGR valve for recirculating exhaust gas from an engine exhaust to an engine intake; and a controller with computer readable instructions stored on non-transitory memory for: updating a nominal compression ratio calibration of the engine based on each of fuel flow and peak torque of each cylinder at each of the plurality of compression ratio settings; adjusting EGR flow to the engine based on the nominal compression ratio calibration at higher than threshold engine load; and adjusting the EGR flow to the engine based on a lowest compression ratio of the updated compression ratio calibration at lower than threshold engine load. In the preceding example, additionally or optionally, the adjusting the EGR flow based on the lowest compression ratio includes: identifying one of the plurality of cylinders having a lowest actual compression ratio; estimating engine dilution for the identified one of the plurality of cylinders; and adjusting an opening of the EGR valve based on the estimated engine dilution. In any or all of the preceding examples, additionally or optionally, the adjusting the EGR flow based on the lowest compression ratio includes reducing an opening of the EGR valve as the lowest compression ratio decreases. In any or all of the preceding examples, additionally or optionally, the engine is coupled in a hybrid electric vehicle and wherein each of the nominal compression ratio calibration and the nominal EGR calibration are based on engine testing data gathered prior to vehicle manufacture.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
updating a nominal calibration schedule for actuating a variable compression ratio (VCR) mechanism of an engine based on each of fuel flow and peak torque of each cylinder of the engine at each compression ratio setting of the (VCR) mechanism;
actuating the VCR mechanism based on the updated calibration schedule; and
adjusting an exhaust gas recirculation (EGR) flow to the engine responsive to the actuation.

2. The method of claim 1, wherein updating the nominal calibration schedule includes:
estimating the fuel flow and the peak torque of each cylinder at a plurality of compression ratio settings;
quantifying a total engine fuel flow of the engine at each of the plurality of compression ratio settings as a sum of the fuel flow of each cylinder at a corresponding compression ratio setting;
learning a total torque of the engine at each of the plurality of compression ratio settings as a sum of the torque of each cylinder at the corresponding compression ratio setting; and
mechanically adjusting a target compression ratio of the engine in accordance with the update calibration schedule.

3. The method of claim 1, wherein the actuating includes:
when driver torque demand is lower than a threshold, actuating the mechanism to one of a plurality of compression ratio settings having a lowest total engine fuel flow; and
when driver torque demand is higher than the threshold, actuating the mechanism to another of the plurality of compression ratio settings having a highest total engine torque.

4. The method of claim 3, wherein the threshold is based on one or more of accelerator pedal position, engine speed, fuel octane, ambient temperature, and ambient humidity.

5. The method of claim 1, where the EGR flow is adjusted based on a lowest of a plurality of actual compression ratios of individual cylinders.

6. The method of claim 5, wherein when the engine load is lower than a threshold, the EGR flow is reduced as the lowest of the plurality of actual compression ratios decreases, the EGR flow reduced by one or more of reducing an opening of an EGR valve, adjusting a cylinder valve timing to advance exhaust valve closing, and adjusting the cylinder valve timing to reduce positive intake to exhaust valve overlap.

7. The method of claim 2, further comprising, selecting the target compression ratio of the engine in accordance with the nominal calibration.

8. The method of claim 5, wherein the engine is coupled in a hybrid electric vehicle, and wherein adjusting the EGR flow includes updating a nominal EGR calibration schedule, the method further comprising updating the nominal calibration schedule of the engine for actuating the VCR mechanism and the nominal EGR calibration schedule responsive to engine operation following vehicle manufacture, the nominal calibration schedule for actuating the VCR mechanism and the nominal EGR calibration schedule based on engine testing prior to the vehicle manufacture.

9. The method of claim 8, wherein when the engine load is higher than the threshold, the EGR flow is adjusted in accordance with the nominal EGR calibration schedule.

10. A method, comprising:
comparing a target compression ratio for an engine with an actual compression ratio of each cylinder of the engine;
computing a fuel penalty associated with the target compression ratio based on an aggregated difference between the actual compression ratio of each cylinder of the engine and the target compression ratio;
transitioning to a lower compression ratio if the fuel penalty exceeds a threshold; and
selectively adjusting an EGR flow to the engine based on the actual compression ratio of a cylinder having a highest difference between actual compression ratio and commanded compression ratio, wherein the actual compression ratio is lower than the commanded compression ratio.

11. The method of claim 9, wherein each of the target compression ratio and the actual compression ratio are for a defined compression ratio setting of a variable compression ratio mechanism, the defined compression ratio setting being one of a plurality of compression ratio settings of the engine.

12. The method of claim 9, wherein the transitioning includes actuating a variable compression ratio mechanism to mechanically alter the actual compression ratio of each cylinder of the engine, and wherein adjusting the EGR flow includes one or more of adjusting an opening of an EGR valve and adjusting a cylinder valve timing to vary exhaust valve closing and/or positive valve overlap.

13. The method of claim 9, wherein the EGR flow is selectively adjusted while engine load is lower than a threshold and wherein while engine load is higher than the threshold, EGR flow is delivered in accordance with a nominal EGR calibration schedule.

14. The method of claim 12, wherein adjusting EGR flow includes adjusting a variable cam timing schedule.

15. The method of claim 14, wherein one of a lower EGR amount, a lower amount of positive valve overlap, and an earlier exhaust valve closing timing is applied as the actual compression ratio of the cylinder having the highest difference between actual compression ratio and commanded compression ratio decreases.

16. An engine system, comprising:
an engine including a plurality of cylinders;
a variable compression ratio (VCR) mechanism coupled to a piston of each cylinder of the plurality of cylinder for applying one of a plurality of compression ratio settings in a given cylinder via mechanical alteration of a piston position within the given cylinder;
an exhaust gas recirculation (EGR) passage including an EGR valve for recirculating exhaust gas from an engine exhaust to an engine intake; and
a controller with computer readable instructions stored on non-transitory memory for:
updating a compression ratio calibration of the engine based on each of fuel flow and peak torque of each cylinder at each of the plurality of compression ratio settings;
actuating the variable compression ratio mechanism of an engine to mechanically adjust a target compression ratio of the engine in accordance with the updated compression ratio calibration; and
actuating the EGR valve to adjust EGR flow to the engine based on the updated compression ratio calibration when engine load is higher than a threshold load.

17. The system of claim 16, wherein the updating includes:
estimating the fuel flow and the peak torque of each of the plurality of cylinders at each of the plurality of compression ratio settings;
for each cylinder, quantifying a total engine fuel flow as a sum of the fuel flow at each of the plurality of compression ratio settings; and
learning a total torque of the engine at each of the plurality of compression ratio settings as a sum of the torque of each of the plurality of cylinders at a corresponding one of the plurality of compression ratio settings.

18. The system of claim 16, wherein the controller includes further instructions for:
when driver torque demand is lower than a threshold, actuating the mechanism to one of the plurality of compression ratio settings having a lowest total engine fuel flow; and
when driver torque demand is higher than the threshold, actuating the mechanism to another of the plurality of compression ratio settings having a highest total engine torque.

19. The system of claim 16, wherein the updating is from a nominal compression ratio calibration based on engine testing prior to vehicle manufacture.

20. The system of claim 16, wherein the actuating the EGR valve includes:
identifying one of the plurality of engine cylinders of the updated compression ratio calibration having a lowest actual compression ratio;
updating an EGR calibration of the engine based on the lowest actual compression ratio of the identified one of the plurality of engine cylinders; and
reducing an opening of the EGR valve to reduce the EGR flow as the lowest actual compression ratio decreases.

* * * * *